Dec. 25, 1945.  E. J. KINGSBURY  2,391,463
CHIP BREAKING STRUCTURE
Filed Dec. 28, 1943  2 Sheets-Sheet 2
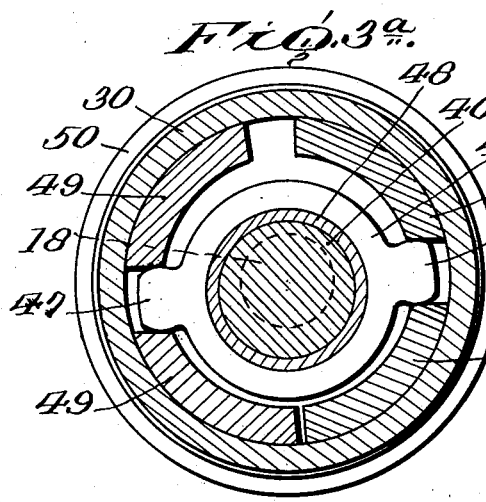
Fig. 3a.
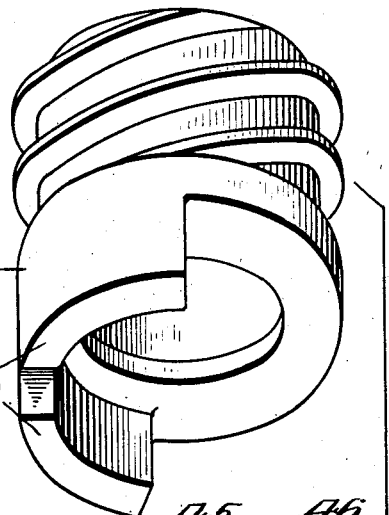
Fig. 5.
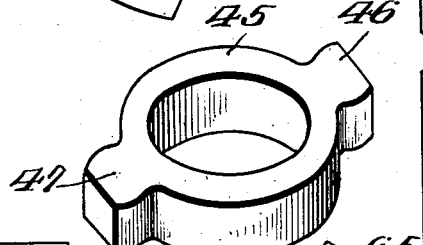
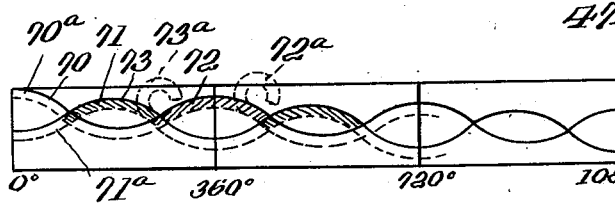
Fig. 4.
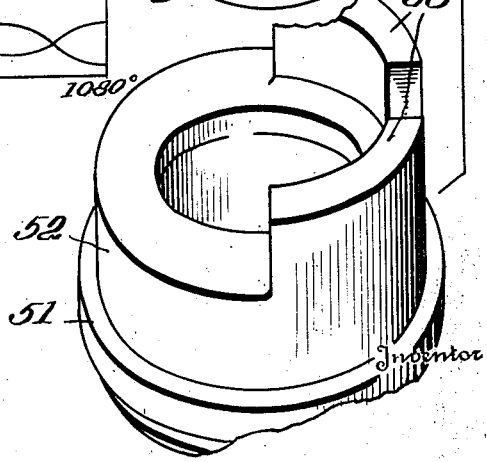
Inventor
EDWARD J. KINGSBURY
By
Attorneys

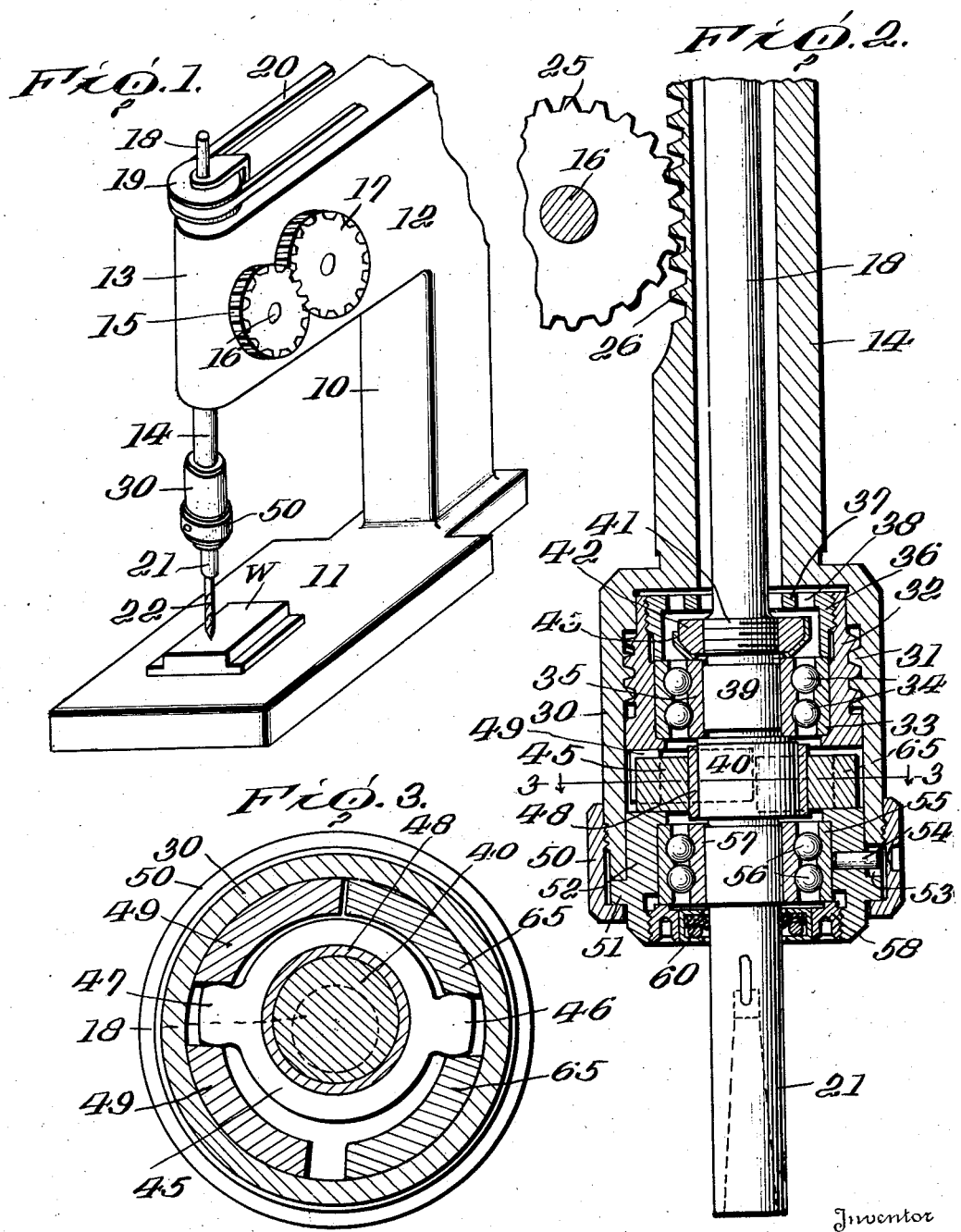

Patented Dec. 25, 1945

2,391,463

UNITED STATES PATENT OFFICE 2,391,463

CHIP BREAKING STRUCTURE

Edward J. Kingsbury, Keene, N. H., assignor to Kingsbury Machine Tool Corporation, Keene, N. H., a corporation of New Hampshire Application December 28, 1943, Serial No. 515,941

8 Claims. (Cl. 77—5)

This invention relates to a chip breaking mechanism for employment in metal drilling and like machines and is more particularly concerned with the control of the feeding movement of a drill or like metal working device, whereby the tool is caused to perform a progressive oscillatory movement during the course of its rotation, wherewith the path of the cutting portion of the tool departs from a uniform helix.

When employed in a metal drilling machine, this departure of the cutting edge of the tool from a condition of tracing a uniform helix permits the removal of the metal in the forming of a series of small chips so that the same can be removed from the cutting face along the flutes of the drill without difficulty of clogging or impeding the free movement of the tool while doing its work.

The feeding mechanism, in accordance with the present invention, comprises a structure including a drill spindle and a support for the same, together with means for producing an axial oscillation of the spindle in said support. Thus, when the support is moved at a uniform rate for feeding the drill the superimposed axial oscillation causes the bit to execute, during the relative retrograde portion of the oscillation, a withdrawal movement which counteracts the said feeding of the support during the same time interval whereby the cutting edge of the drill bit is caused to pass through the surface of the metal being cut and thus produce a series of separate chips.

In the structural embodiment of the invention shown in the accompanying drawings, the drill spindle has a cam or eccentric member which causes movement of a motion-transmitting structure whereby a member is oscillated and caused to move on a warped path located on the support so that the axial oscillation is produced. More specifically, the cam or eccentric causes rocking of a lever and thereby an arcuate movement of a threaded member about the axis of the spindle, this threaded member being engaged with the support and thereby causing the spindle to move axially during the course of the oscillation.

In the accompanying drawings is illustrated one form of practice of the invention:

Figure 1 is a perspective view of a metal drilling machine having the present invention therein.

Figure 2 is an upright sectional view through the spindle and quill assembly of the illustrated metal drilling machine.

Figures 3 and 3a are sections essentially on line 3—3 of Figure 2 representing different positions of the parts.

Figure 4 is an unfolded view representing the path of successive movement of the two lips of an ordinary drill bit.

Figure 5 is a perspective view showing the rock lever and its co-acting parts, with the spindle omitted and the parts separated for revealing the engaging structures.

In these drawings, Figure 1 shows a conventionalized metal drilling machine having a stand or upright support 10 with a drill table 11 thereon. The top bracket 12 provides a housing 13 in which the quill 14 may be reciprocated upon rotation of a quill feeding means conventionally shown as including a gear 15 mounted on a shaft 16, this gear 15 being driven by a gear 17 which receives power (by means not shown) for producing a downward feeding motion of the quill 14, and usually producing a retraction thereof automatically at the completion of a drilling operation. Within the quill 14 is a drill spindle 18 which is illustrated as driven by a pulley 19 and a driving belt 20. At the lower end of the drill spindle is a chuck 21 for receiving a drill bit 22 which is illustrated as being of the usual two-fluted spiral type, with two drilling lips.

As shown in Figure 2, the shaft 16 supports, within the housing 13, a quill gear 25, which engages with the rack teeth 26 on the quill 14.

The lower end of the quill 14 is provided with a housing 30 having an internal chamber, and the upper portion of the wall of this chamber is provided with screw threads 31. An annular threaded member 32 engages with the thread 31, along the helical surfaces which are warped relative to radial planes through the spindle axis so that upon rotation or rocking of the threaded member 32, it executes a movement along the line of the axis of the spindle 18. The threaded member 32 has an internal flange at its lower end, against which abuts the outer race 33 of an anti-friction bearing having the balls 34 and the inner race 35 and acting to sustain radial and axial loads. An internal clamping nut 36 is threadedly engaged in the upper end of the member 32 for clamping the outer race 33 fixedly in position. This clamping nut 36 is illustrated as having an inwardly directed upper flange 37 provided with holes 38 for a spanner wrench.

The spindle 18 has an illustrated concentric portion 39 which fits closely in the inner race 35. Immediately below this portion 39 is an eccentric portion 40 of circular outline about an axis offset from the axis of the spindle 18. Above the portion 39, the spindle 18 has a thread 41 for receiving a clamping nut 42 which acts to hold the inner race 35 against axial movement relative to the spindle by forcing it toward the shoulder provided at the upper end face of the eccentric portion 40. Locking means 43 are preferably included for holding the nut 42 in position.

Surrouding the eccentric portion 40 is a rock lever 45 having diametrically opposite ends 46, 47 which are preferably rounded in contour as shown in Figures 3 and 3a. It is preferred to include a bearing bushing 48 between the lever 45 and the outer race of the eccentric 40.

The threaded member 32 has a downwardly projecting structure formed by a pair of fingers 49 (Figures 3, 3a and 5) extending parallel to the spindle axis and spaced apart a distance closely corresponding to the width of the lever end 47.

At the lower end of the housing 30 is a clamping nut 50 which engages a flange 51 of a sleeve 52 which fits closely within the housing 30 for a major part of its length, with the flange 51 projecting so that the nut 50 clamps the frame tightly against the lower end surface of the housing 30. It is preferred to provide a notch 53 at the lower end of the housing 30 for receiving a pin 54 carried by the sleeve 52, wherewith to assume against relative rotation of the sleeve 52 in the housing 30.

The upper end of the sleeve 52 has an inturned flange for engaging the outer race 55 of an antifriction bearing having the balls 56 and the inner race 57. An annular clamping member 58 is threaded into the lower end of the sleeve 52 and engages the lower face of the outer race 55 to clamp the same in position relative to the housing 30. The inner race 57 is permitted a relative floating movement with respect to the spindle 18 so that the spindle may be axially oscillated with respect thereto. It is preferred to provide a packing seal 60 within the clamping member 58, to prevent entrance of dirt or loss of lubricant.

The sleeve 52 has a projecting structure at its upper end formed as two projecting fingers 65 which are spaced apart a distance equal to the width of the lever end 46 (Figures 3, 3a and 5).

In this assembly, it will be noted from Figures 2, 3 and 3a, the lever end 46 is engaged between the fingers 65, and thereby is afforded a fulcrum upon the support structure. The other lever end 47 is engaged between the projections 49 and is caused to oscillate in a horizontal plane by the action of the cam or eccentric 40 on the spindle, wherewith the projecting fingers 49 perform limited arcuate oscillations about the axis of the threaded member 32 cyclically for each revolution of the spindle 18.

During the course of rotation of the spindle 18, the eccentric 40 turns about the spindle axis and causes the rock lever 45 to travel in a rocking and sliding fashion wherewtih its lever end 46 provides a fulcrum relative to the support so that the lever rocks in a horizontal plane between the positions shown in Figures 3 and 3a, and also makes a relative sliding movement along the opposed surfaces of the projections 65, with a component of motion in a direction radial with respect to the axis of the spindle 18. Similarly, the lever end 47 produces the aforesaid cyclic peripheral oscillation of the fingers 49 and therewith of the threaded member 32, along with performing a sliding movement along the opposed surfaces of the fingers 49.

As shown in Figure 4, the operation of the structure with a double-lipped metal drill bit causes the two lips of this drill to individually perform feeding movements consisting of a uniform component developed by the quill gear 25 in moving the quill 26 which provides a support for the drill spindle during its rotation, together with the axial oscillation of the spindle in the supporting quill, as producing during each revolution of the spindle 18 itself. Figure 4 represents the traces of the two drill bit edges during the course of three revolutions. The curve 70 represents the general path of movement of the outer corner of one lip along the cylindrical wall of the hole being drilled, this path being represented by a solid line. The second lip simultaneously performs a curve 71 which is 180° out of phase with respect to the curve 70. It will be noted that each lip performs an axial oscillatory motion in addition to the general advance, and that each lip successively gouges into the bottom of the hole being drilled and then retreats so that individual chips are formed. In denoting the motion during the second revolution, the graph for the first lip may also be represented by the dash line in the left hand panel of Figure 4, from which it will be noted that this first drill lip enters into the metal and cuts out a chip 72 which is curled into a conical shape 72a and thus forms a particle which does not block the drill in its further movement. Similarly, the path of the second lip may be represented in this diagram by the dotted line 71a, and it will be noted that this second lip enters the work and cuts away chip 73 which likewise is rolled into a conical particle 73a. It will be understood that the chips 72a, 73a are being cut at the same time at portions of the work which are 180° separate in phase; or stated, in another way, they are cut simultaneously at the opposite sides of the bottom of the hole.

It will be noted that the withdrawal of the lips brings these free of the surface of the metal at the bottom of the hole so that individual chips are formed as discrete individual particles.

It is obvious that the invention is not limited to the form of construction shown, but that it may be employed in many ways within the scope of the appended claims.

What is claimed is:

1. In metal drilling and like machines, a rotatable drill spindle, a support for the spindle during its rotation, means for feeding said support, a threaded portion on said support, a threaded member engaged with said threaded portion, thrust bearing means between said spindle and threaded member, and means actuated by the spindle in its rotation to effect limited arcuate oscillatory movements of the threaded member and thereby cause continuous axial reciprocation of the spindle relative to said support.

2. In metal drilling and like machines, a rotatable drill spindle, a support for the spindle during its rotation, means for feeding said support, a threaded portion on said support, a threaded member engaged with said threaded portion, thrust bearing means between said spindle and threaded member, a cam on the spindle, a rock lever movable by said cam, said lever being fulcrumed at one end on said support and engaged at the other end with the threaded member whereby continuously to oscillate the same arcuately as the spindle rotates and effective for retracting the spindle during each revolution thereof and in the axial direction opposed to the movement by said feeding means whereby the material of the work piece is removed in the form of separate chips.

3. In metal drilling and like machines, a rotatable drill spindle, a support for the spindle during its rotation, an eccentric on the spindle, and a rock lever having a central aperture fitting said eccentric and extending substantially in a radial plane therefrom, said support including a fixed bushing having a projection extending parallel to the spindle axis and engaged with one end of the lever so that the latter may slide thereon and rock relative to the spindle axis, said threaded member having a projection extending parallel to the spindle axis and engaged with the other end of the lever so that the threaded member is oscillated about its axis during the rotation of the spindle and thereby provokes axial reciprocation of the spindle relative to the support.

4. In metal drilling and like machines, a frame, a support, a drill spindle rotatable and slidable in said support, means for feeding the support on the frame, means providing a surface on the support which is warped relative to a radial plane through the spindle axis, a member engaging said warped surface, thrust bearing means between said spindle and member, and means actuated by the spindle during its rotation to move said member back and forth relative to said warped surface and thereby operate through said thrust bearing means continuously to effect axial reciprocating movement of the spindle independently of said feeding means.

5. In metal drilling and like machines, a support, a means for feeding said support, a drill spindle rotatable in said support, a member threadedly engaged with said support for movement along the axis of the spindle, an eccentric on the spindle, means actuated by said eccentric and connected for oscillating the member, and thrust bearing means for transmitting the threading axial oscillating movement of the member to said spindle for continuously axially reciprocating the same relative to said support.

6. In metal drilling and like machines, a rotatable drill spindle, a support for the spindle during its rotation, means for feeding said support, said spindle being axially movable in said support, and means actuated by the spindle during its rotation and including an element having an oscillatory rotary and axial movement and bearing against the support and spindle to provoke continuous supplemental axial oscillations of the spindle in said support independently of the feeding movement of the support.

7. In metal drilling and like machines, a frame, a support, a drill spindle rotatable and slidable in said support, means for feeding the support on the frame, a member threadably engaged with the support for movement along the axis of the spindle, a thrust bearing for transmitting an axial movement of the member to the spindle, an eccentric on the spindle, and a rock lever having an aperture embracing the eccentric so that the rock lever is moved by the eccentric, said rock lever having one end extending radially from the eccentric, and engaged with the support, said rock lever having another end extending in the opposite direction from the eccentric and engaged with the member, whereby the rock lever is oscillated during each revolution of the spindle and thereby causes a rotative and axial oscillation of the member and therewith an axial reciprocation of the spindle relative to the support.

8. In metal drilling and like machines, a frame, a support, a drill spindle rotatable and slidable in said support, means for feeding the support on the frame, a member threadably engaged with the support for movement along the axis of the spindle, a thrust bearing for transmitting an axial movement of the member to the spindle, an eccentric on the spindle, the support and member having fingers at their peripheries extending axially into the radial plane of the eccentric, the fingers on the support being located substantially diametrically opposite the fingers on the member, and a rock lever extending diametrically past the spindle and having an aperture embracing the eccentric so that the rock lever is moved by the eccentric, one end of the rock lever being fulcrumed on the fingers on the support and the other end of the rock lever being engaged with the fingers on the member, whereby the rock lever is oscillated during each revolution of the spindle and thereby causes a rotative and axial oscillation of the member and therewith an axial reciprocation of the spindle relative to the support.

EDWARD J. KINGSBURY.